US012103583B2

United States Patent
Huber et al.

(10) Patent No.: US 12,103,583 B2
(45) Date of Patent: Oct. 1, 2024

(54) STEERING SYSTEM FOR A MOTOR VEHICLE

(71) Applicants: thyssenkrupp Presta AG, Eschen (LI); thyssenkrupp AG, Essen (DE)

(72) Inventors: Sebastian Huber, Goefis (AT); Tim Bayer, Luechingen (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 18/199,049

(22) Filed: May 18, 2023

(65) Prior Publication Data

US 2023/0373554 A1    Nov. 23, 2023

(30) Foreign Application Priority Data

May 20, 2022   (EP) .................................... 22174518

(51) Int. Cl.
  B62D 1/181       (2006.01)
  B62D 1/19        (2006.01)

(52) U.S. Cl.
  CPC ............. B62D 1/181 (2013.01); B62D 1/195 (2013.01)

(58) Field of Classification Search
  CPC ........... B62D 1/181; B62D 1/19; B62D 1/195
  See application file for complete search history.

(56) References Cited

U.S. PATENT DOCUMENTS

| 5,375,881 A * | 12/1994 | Lewis ..................... F16F 7/123 188/374 |
| 5,517,877 A * | 5/1996 | Hancock ................. F16F 7/123 188/371 |
| 5,520,416 A | 5/1996 | Singer, III et al. |
| 7,325,834 B2 * | 2/2008 | Manwaring ............ B62D 1/195 280/777 |

(Continued)

FOREIGN PATENT DOCUMENTS

| DE | 102011083190 A1 | 3/2013 |
| DE | 102018204735 A1 | 10/2018 |

(Continued)

OTHER PUBLICATIONS

Huber et al., Steering column For a Motor Vehicle, Feb. 25, 2021, EPO, WO 2021/032525 A1, Machine Translation of Description (Year: 2021).*

*Primary Examiner* — James A English
(74) *Attorney, Agent, or Firm* — thyssenkrupp North America, LLC

(57) ABSTRACT

The disclosure includes a Steering column for a motor vehicle including at least two structural elements configured to be adjusted relative to each other and a linear adjustment drive configured to be adjusted in an adjustment direction in a motorised manner along an adjustment axis (S) configured to engage one of the at least two structural elements, and wherein an energy absorption device comprising an energy absorption element is arranged between the linear adjustment drive and at least one of the at least two structural elements. The energy absorption element includes an inner (Continued)

portion coaxial relative to the adjustment axis (S) and connected by an at least partially coaxially extending shaping portion in a sleeve-like manner to an outer portion of the energy absorption element which is arranged coaxially at the outer side thereof.

11 Claims, 3 Drawing Sheets

(56) References Cited

U.S. PATENT DOCUMENTS

| | | | |
|---|---|---|---|
| 8,899,622 B2* | 12/2014 | Read | B62D 1/181 |
| | | | 280/775 |
| 10,960,917 B2* | 3/2021 | Schnitzer | B62D 1/195 |
| 11,186,308 B2 | 11/2021 | Kwon et al. | |
| 2016/0046318 A1 | 2/2016 | Stinebring et al. | |
| 2019/0126968 A1 | 5/2019 | Messing et al. | |
| 2019/0176870 A1* | 6/2019 | Ganahl | B62D 1/185 |
| 2020/0172147 A1 | 6/2020 | Caverly et al. | |
| 2021/0024120 A1 | 1/2021 | Rey | |
| 2021/0039706 A1 | 2/2021 | Schmidt | |
| 2021/0323598 A1* | 10/2021 | Watanabe | B62D 1/181 |
| 2022/0048556 A1 | 2/2022 | Kim et al. | |
| 2022/0063703 A1* | 3/2022 | McClelland | B62D 1/192 |
| 2022/0177022 A1 | 6/2022 | Huber et al. | |

FOREIGN PATENT DOCUMENTS

| | | |
|---|---|---|
| DE | 102019203336 A1 | 9/2020 |
| DE | 102019203363 A1 | 9/2020 |
| DE | 102020109779 A1 | 10/2020 |
| DE | 102020202536 A1 | 9/2021 |
| DE | 102021108224 A1 | 10/2021 |
| EP | 3901002 A1 | 10/2021 |
| WO | 2020185030 A1 | 9/2020 |
| WO | WO-2021032525 A1 * | 2/2021 ............. B62D 1/181 |

* cited by examiner

STEERING SYSTEM FOR A MOTOR VEHICLE

CROSS REFERENCE TO RELATED APPLICATION

This application is a U.S. Non-Provisional that claims priority to European Patent Application No. EP 22174518.5, filed May 20, 2022, the entire content of which is incorporated herein by reference.

FIELD

The disclosure generally relates to a steering column for a motor vehicle, and more specifically to a steering column with structural elements which can be adjusted relative to each other and with which a linear adjustment drive which can be adjusted in an adjustment direction with an energy absorption element arranged between the adjustment drive and at least one of the structural elements.

BACKGROUND

A generic adjustable steering column, as described, for example, in DE 10 2019 203 363 A1 has in the spatial position thereof components which can be adjusted relative to each other in order to enable an adaptation of the manual operating position.

A steering column generally has a covering unit which is also referred to as a guiding box, outer covering pipe or box swing arm and in which a steering spindle is rotatably supported about a longitudinal axis, at the end portion, facing the driver position, of which spindle at the rear in the travel direction a manual steering input means is fitted, for example, a steering wheel or the like. In order to produce a longitudinal adjustment, in the covering unit an actuation unit which supports the steering spindle can be adjustable in a telescope-like manner in the longitudinal direction determined by the longitudinal axis so that the covering unit and the actuation unit represent components which can be adjusted relative to each other. Alternatively or additionally, a height adjustment can be produced in that the covering unit is retained by a carrier unit which is fixed to the vehicle body so as to be able to be adjusted in a vertical direction transversely relative to the longitudinal axis. The carrier unit and the covering unit then form components which can be adjusted relative to each other.

In order to carry out a motorised adjustment of the steering column, it is generically known to introduce between two components which can be adjusted relative to each other a linear motorised adjustment drive, for example, an electromotive spindle drive or the like. Such an actuation drive generally has a fixed drive unit and an activation or actuation element which can be adjusted relative thereto in a linear manner in an adjustment direction—in the case of a spindle drive in the direction of the spindle axis. As a result of the fact that the drive unit is fixed to a component and the actuation element engages on another component, these components can be adjusted relative to each other by moving the adjustment drive together or apart. For example, the actuation unit together with the steering wheel can be moved in a longitudinal direction in or out of the covering unit, or the covering unit can be pivoted upwards or downwards relative to the vehicle body.

In order to improve the passenger safety in the event of a vehicle collision, a so-called crash in which the driver strikes the steering wheel at high speed, it is known to couple between the components of the steering column which can be adjusted relative to each other by means of the adjustment drive an energy absorption apparatus which is also referred to as a crash device. This apparatus absorbs the kinetic energy which is introduced in the event of a crash into an energy absorption element, for example, by means of plastic deformation of a deformation element. A controlled braking of the member striking the steering wheel can thereby be carried out.

From DE 10 2019 203 363 A1 mentioned, it is known to integrate the energy absorption device between the adjustment drive and the components can be adjusted relative to each other. In the event of a crash, the components can thereby be moved relative to each other for example, in the longitudinal direction, with energy absorption and braked. The solution known in the prior art proposes that, as a result of the high crash force acting in the event of a crash, the gear mechanism of the drive unit is separated, and the fragments are braked. This arrangement may be compact, but it is structurally complex and limited in terms of the energy absorption properties, for example, with regard to the length of the absorption path. An alternative solution which is disclosed, for example, in DE 10 2018 204 735 A1 is also effective, but is also complex and functionally limited.

Thus, a need exists to enable a simpler construction, an expanded functionality, and increased reliability in crash situations.

BRIEF DESCRIPTION OF THE FIGURES

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
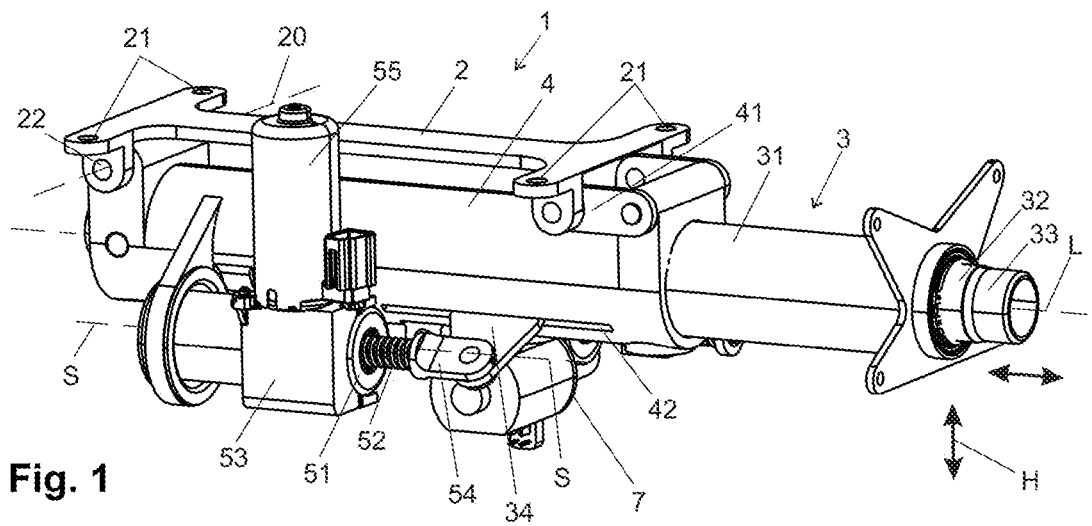
FIG. 1 shows a perspective view of a steering column according to the disclosure in a normal operating state.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims.

In addition, all references to one skilled in the art shall be understood to refer to one having ordinary skill in the art.

In a steering column for a motor vehicle, comprising at least two structural elements which can be adjusted relative to each other and with which a linear adjustment drive which can be adjusted in an adjustment direction in a motorised manner along an adjustment axis engages, wherein between the adjustment drive and at least one of the structural elements an energy absorption device comprising an energy absorption element is arranged, there is provision according to the disclosure for the energy absorption element to have an inner portion which is coaxial relative to the adjustment axis and which is connected by means of an at least partially coaxially extending shaping portion in a sleeve-like manner to an outer portion which is arranged coaxially at the outer side.

Unless stated otherwise, the adjustment direction will also be referred to synonymously below as the axial direction. The shaping portion may also be referred to as a deformation portion. The adjustment drive is connected to a component by means of the energy absorption element in such a manner that in the event of a crash with a relative movement of this structural element in the adjustment direction kinetic energy is absorbed in the connection to the adjustment drive.

The energy absorption element according to the disclosure has a sleeve-like arrangement, which is coaxial relative to the adjustment axis, of an inner portion and an outer portion which are connected to each other in a sleeve-like manner at an end face by means of a shaping portion.

As a result of a relative axial movement of the inner portion with respect to the outer portion, the inner portion can be turned up in the region of the shaping portion. During turning up, the circumferential inner wall is turned over the entire circumference thereof radially outwards in the direction towards the outer portion, wherein the turned-up portion is moved back axially over the inner portion which is not turned-up and surrounds this portion as an outer portion. In other words, during turning-up, the inner portion passes through with plastic deformation of the shaping portion and is changed into the outer portion.

The shaping portion has a curved cross section with a radius of curvature the centre of which, the centre of curvature, is located on a bending track which is arranged concentrically with respect to the adjustment axis. The bending track preferably extends circumferentially radially between the inner portion and outer portion. The radius of curvature is preferably smaller than the radial spacing between the inner and outer portion with respect to the adjustment axis.

In the event of a crash, the crash force acting axially between the inner and outer portion is greater than the axial rigidity of the shaping portion. There is thereby a relative axial movement of the inner and outer portion. The inner portion is introduced in the adjustment direction axially into the outer portion. In this instance, the bending track moves and consequently the centre of curvature of the shaping portion moves, also in an axial direction, which is to say, in an adjustment direction, in an opposing manner relative to the inner and outer portion. The inner portion when passing through the curved shaping portion with plastic deformation is continuously changed into the outer portion, or vice versa, so that in any case as a result of the plastic deformation kinetic energy is continuously absorbed.

During turning-up, which can also be referred to as turning upside down, there is produced a three-dimensional plastic deformation during which the inner portion is radially expanded when introduced into the shaping region and a continuous toroidal shaping is carried out along the above-mentioned bending track. This results in the inner circumference of the inner portion being turned, inverted or rolled outwards in such a manner that after passing through the shaping portion, it forms the outer circumference of the outer portion. In this instance, it is advantageous that a relatively high degree of shaping is possible in a small space so that with a compact construction type a relatively high energy absorption can be produced.

Another advantage is that the coaxial arrangement of the inner portion in the outer portion forms a type of telescope-like arrangement which has a relatively high flexural rigidity or buckling resistance transversely relative to the adjustment axis. It is thereby ensured to a particular degree that as a result of the high crash force which is axially introduced no uncontrolled lateral breaking-out or buckling of the energy absorption element is carried out. The sleeve-like coaxial arrangement ensures a lateral stabilisation during the shaping so that, in the event of a crash, controlled and uniform energy absorption is advantageously carried out.

The shaping portion can preferably be constructed continuously over the circumference in accordance with a closed inner portion in the circumferential direction which extends through the shaping portion when turned up.

It is advantageous for the shaping portion to be in the form of a part-torus. The part-torus-like shaping portion may, for example, be in the form of a half-torus or a quarter-torus and may in this instance comprise any form of a channel-like, axial bulging or protrusion, a bead or the like which extends in a circumferential direction at least partially concentrically relative to the adjustment axis. It may be connected at the radially inner edge thereof to the inner portion at the end face and with the radially outer edge thereof to the outer portion. An advantage is the continuous, or preferably continuously differentiable, curved path of the cross section in the shaping region, which enables a continuously progressive plastic deformation and a uniform energy absorption.

Preferably, there may be provision for the outer portion and/or the inner portion and/or the shaping portion to be constructed in a rotationally symmetrical manner. Preferably, the outer portion and/or the inner portion may be constructed in a tubular manner. With respect to the adjustment axis, to this end a coaxial outer pipe or an outer sleeve or an inner pipe or an inner sleeve may be provided, preferably hollow-cylindrical with a circular cross section. Advantages are a uniformly high flexural rigidity and buckling resistance in all radial directions and a relatively low production and assembly complexity.

It is advantageous for the energy absorption element to be constructed in one piece. An integral sleeve-like tubular component can be provided with a low level of production complexity as a shaped component, for example, as a preferably cold-formed pressed component which may be formed from a tubular portion or as a deep-drawn component.

There may be provision for the energy absorption element to be constructed from a metal material and/or a plastics material. For example, a rational production from steel sheet or pipe may be carried out, whereby a high energy absorption with a small construction type can be achieved.

The value of the energy absorption can be predetermined and adapted in a structurally simple manner by the material thickness, wherein a greater wall thickness enables a greater energy absorption. Alternatively or additionally, a plastics material can be used, wherein the energy absorption element as a whole can be produced, for example, as an injectionmoulded component from a thermoplastic plastics material. As a result of the fact that a preferably integral metal base member is provided completely or partially with a plastics material, for example, by means of a coating, covering or over-moulding, an optimised plastic deformation behaviour can be achieved. Furthermore, the friction during deformation can be reduced, whereby a homogenised energy absorption can be enabled.

Preferably, there is provision for the outer portion or the inner portion to be axially connected to a component by means of a support element and supported axially against it. The support element may preferably have a support portion which protrudes transversely relative to the adjustment direction, and which has a coaxial opening to the edge of which the outer portion is secured and through which the inner and outer portion can be axially introduced in the event of a crash.

The support element can at the same time be constructed to retain and axially support the adjustment drive. The support element may, for example, be in the form of a flange which is connected to the outer portion.

It is possible for the components to comprise a covering unit and an actuation unit which can be adjusted therein in the longitudinal direction along a longitudinal axis, and/or a carrier unit and a covering unit which can be adjusted relative thereto in a longitudinal direction and/or a vertical direction. In the actuation unit, a steering spindle may be rotatably supported about the longitudinal axis to which as a manual steering input means a steering wheel or the like may be able to be fitted.

As a result of the fact that the adjustment drive including the energy absorption device according to the disclosure is interposed between the covering unit and actuation unit, an energy absorption in the longitudinal direction is enabled in order to effectively brake a member which strikes the steering wheel in the event of a crash. As a result of the disclosure, a compact structural type can be produced and, as a result of the above-mentioned high level of buckling resistance and flexural rigidity of the energy absorption element, a high level of operational reliability is ensured even under extreme loads. These advantages can additionally or alternatively be achieved by means of an arrangement between a vertically adjustable covering unit and a carrier unit which is secured to the body.

The adjustment drive may be axially supported on the inner portion or the outer portion. As a result of the fact that the adjustment drive is axially fixed to the inner portion in the adjustment direction and the outer portion, preferably by means of a support element, is fixed to a component, the energy absorption device according to the disclosure can be structurally integrated in a structurally simple and operationally reliable manner.

There may be provision for the adjustment drive to have a motorised drive unit and an actuation element which can be adjusted relative thereto. The drive unit preferably has an electric motor, the drive torque of which can be converted into a relative linear displacement of the actuation element in the adjustment direction, preferably by means of a correspondingly constructed gear mechanism. The drive unit may be connected to and axially supported by the energy absorption element, which is connected to one fixed component, wherein the actuation element is connected to the other component which can be adjusted relative to the fixed component, or vice versa.

Preferably, it is possible for the adjustment drive to have a spindle drive. In a spindle drive, in a manner known per se, a spindle nut and a threaded spindle which engages therein can be rotatably driven relative to each other about the spindle axis, whereby they are adjusted relative to each other in a linear manner in the direction of the spindle axis. The spindle drive may be in the form of a rotation spindle drive or an immersion spindle drive. In the rotation spindled drive, the threaded spindle is rotatably driven in the drive unit and in this instance supported axially on a component, and the spindle nut is axially supported with respect to the rotation in a fixed manner on the other adjustable component. In the immersion spindle drive, the spindle nut is rotatably driven in the drive unit and in this instance axially supported on a component, and the threaded spindle is axially supported with respect to the rotation in a fixed manner on the other, adjustable component. It is preferable for the adjustment axis to be identical to the spindle axis so that the energy absorption element according to the disclosure is constructed coaxially with respect to the spindle axis. A symmetrical coaxial introduction of force can thereby be carried out substantially without potentially disruptive transverse forces, whereby the functional and operational reliability is increased, in particular also in comparison with asymmetrical arrangements, in which the adjustment drive is supported at one side on an energy absorption element and transverse forces are inevitable. According to the disclosure the construction can be simplified in that as a result of the high level of flexural rigidity and buckling resistance of the energy absorption element according to the disclosure no additional guiding means have to be provided for transverse stabilisation.

There may advantageously be provision for the spindle drive to have a drive unit which is connected to the energy absorption device. The inner portion may, for example, be directly connected to a drive housing of the drive unit or be structurally integrated. The drive housing in which the spindle nut or the threaded spindle is supported so as to be able to be coaxially driven in rotation, may preferably be tubular and may substantially correspond in terms of its dimensions to the preferably similarly tubular inner portion. A constructively simple structural integration can thereby be carried out and a compact construction type is enabled.

In the various Figures, identical components are always given the same reference numerals and are therefore also generally only named or mentioned once.

Figure 2:
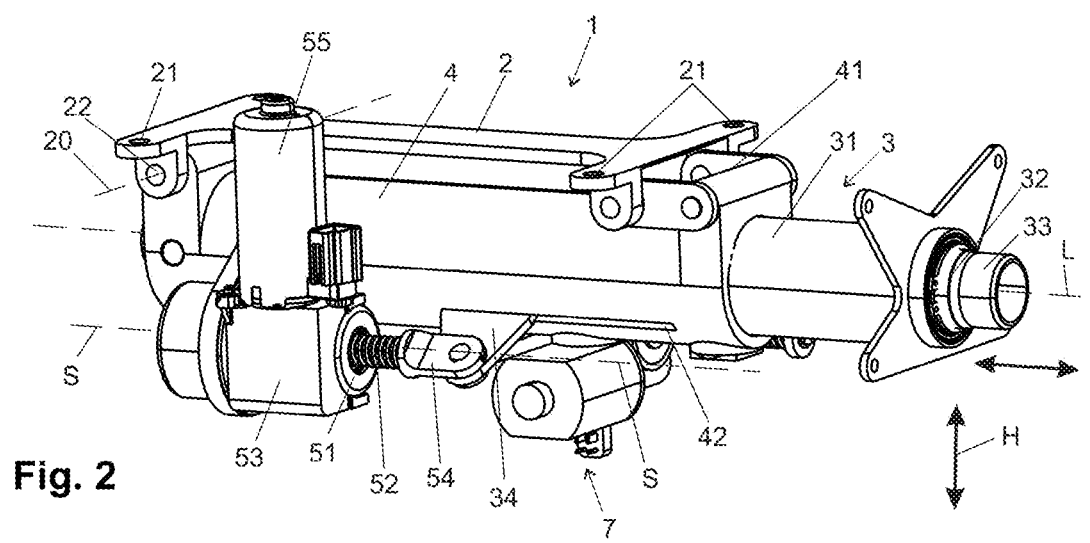
FIG. 2 shows a perspective view of the steering column of FIG. 1 after a crash.

FIGS. 1 and 2 show a steering column 1 according to the disclosure as a schematic perspective view obliquely from the right towards the rear end, with respect to the travel direction of a vehicle which is not illustrated, where a steering wheel which is not illustrated here is retained in the operating region. In this instance, FIG. 1 shows a normal operating state and FIG. 2 shows the state after a crash (crash state).

The steering column 1 comprises a carrier unit 2, which has securing means 21 in the form of securing holes which are used for fitting to a vehicle body which is not illustrated. There is retained by the carrier unit 2 an actuation unit 3 which is received in a covering unit 4 in an outer covering, which is also referred to as a guiding box or box swing arm.

The actuation unit 3 has an inner covering 31 (covering pipe) in which a steering spindle 32 is rotatably supported about a longitudinal axis L which extends axially in the longitudinal direction, which is to say, in the direction of the longitudinal axis L. At the rear end there is formed on the steering spindle 32 a securing portion 33 on which a steering wheel which is not illustrated in this instance can be fitted.

In order to produce a longitudinal adjustment, the actuation unit 3 is received in the covering unit 4 so as to be able to be displaced in a telescope-like manner in the direction of the longitudinal axis in order to be able to position the steering wheel which is connected to the steering spindle 32 relative to the carrier unit 2 forwards and backwards in the longitudinal direction relative to the carrier unit 2, as indicated by the double-headed arrow parallel with the longitudinal axis L.

The covering unit 4 is supported in a pivot bearing 22 on the carrier unit 2 so as to be able to be pivoted about a horizontal pivot axis 20 which is located transversely relative to the longitudinal axis L. In the rear region, the covering unit 4 is connected to the carrier unit 2 by means of an actuation lever 41. As a result of a rotational movement of the actuation lever 41 by means of an actuation drive 6 which is illustrated (see FIG. 2), the covering unit 4 can be pivoted relative to the carrier unit 2 about the pivot axis 20 which is located horizontally in the installation state, whereby an adjustment of a steering wheel which is fitted to the securing portion 33 can be carried out in a vertical direction H, as indicated with a double-headed arrow.

An adjustment drive 5 is in this first embodiment in the form of an immersion spindle drive and has a spindle nut 51 in which a threaded spindle 52 which extends along the spindle axis S thereof engages. The spindle axis S is identical to the adjustment axis in the context of the disclosure which indicates the linear adjustment direction. In the example of the shown adjustment drive 5 for longitudinal adjustment, the spindle or adjustment axis S is located parallel with the longitudinal axis L.

The threaded spindle 52 is connected to the actuation unit 3 with a securing element 54 which is formed on the rear end thereof by means of a transmission element 34, securely in the direction of the spindle axis S or the longitudinal axis L and fixed with respect to rotation about the spindle axis S.

The transmission element 34 extends from the actuation unit 3 through a slot-like through-opening 42 in the covering unit 4. In order to adjust the steering column 1 in the longitudinal direction, the transmission element 34 can be moved freely in the through-opening 42 in the longitudinal direction.

The spindle nut 51 is supported axially in a drive unit 53 in the direction of the spindle axis S and can be rotatably driven by an electric motor 55 about the spindle axis S relative to the threaded spindle 52.

As a result of the rotatably drivable spindle nut 51 and the threaded spindle 52 which is fixed relative thereto with respect to rotation, a so-called immersion spindle drive is produced. In this instance—depending on the rotation direction of the motor 55—the threaded spindle 52 can be displaced translationally in the direction of the spindle axis S relative to the spindle nut 51 so that the actuation unit 3 which is connected to the threaded spindle 52 can accordingly be adjusted relative to the covering unit 4 which is connected to the spindle nut 51 in the direction of the longitudinal axis L.

The adjustment drive 5 is supported on the covering unit 4 by means of an energy absorption device 6 according to the disclosure. For clarity, in FIG. 3 and FIG. 4 a longitudinal section along the spindle axis S is shown, in FIG. 3 in the normal operating state as in FIG. 1, and in FIG. 4 in the state as in FIG. 2 following a crash. FIG. 5 shows the energy absorption device 6 from FIG. 4 in an enlarged detailed illustration.

The energy absorption device 6 according to the disclosure has a rotationally symmetrical energy absorption element 61 which is coaxial relative to the spindle axis S and which is constructed according to the disclosure in a sleeve-like manner, as explained below.

The enlarged illustration of FIG. 5 shows that the energy absorption element 61 has a cylindrical tubular inner portion 62 which is arranged coaxially relative to the spindle axis S and which merges via an end-face bead-like shaping portion 63 into an outer portion 64 which coaxially surrounds the inner portion 63.

The outer portion 64 has a circumferential flange 65 which is supported axially on a support element 66 and which is securely connected to the covering unit 4.

The hollow-cylindrical inner portion 62 is received and secured coaxially in the drive housing 53. In this instance, the spindle nut 51, which has on the outer side, for example, a worm gear which is in meshing engagement with a screw which is driven by the motor 55, can be preferably rotatably supported coaxially about the spindle axis S inside the tubular inner portion 62 in a bearing arrangement 56 and axially supported.

Figure 4:
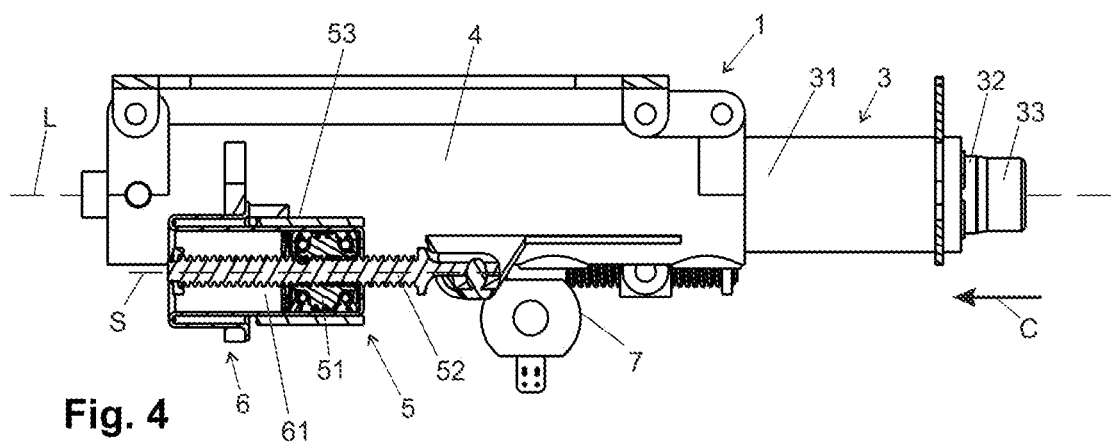
FIG. 4 shows a sectional view through the steering column of FIG. 2 along the adjustment axis.
Figure 5:
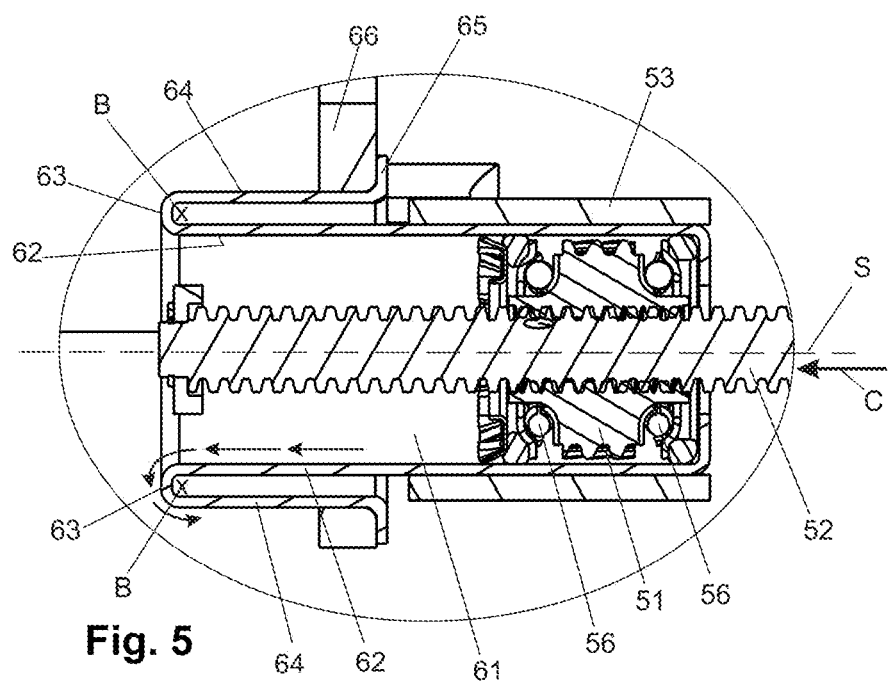
FIG. 5 shows an enlarged detailed view of an energy absorption apparatus of FIG. 4.

In the event of a crash, a high axial crash force C is introduced into the actuation unit 3 via the steering spindle 32, as illustrated in FIG. 4. This crash force C acts via the threaded spindle 52, the spindle nut 51 and the drive housing 53 axially with respect to the spindle axis S on the inner portion 62 of the energy absorption element 61. In this instance, with plastic, toroidal bending along a bending track B which extends coaxially about the spindle axis S, it is continuously bent up or over in a radially outward direction, wherein it merges into the outer portion 64, or in other words is shaped into a component of the outer portion 64. This plastic shaping operation which consumes kinetic energy is indicated in FIG. 5 with the dashed arrows.

Via the flange 65, the free end of the outer portion 64 is fixed to the covering unit 4 by means of the support element 66. During the deformation in the event of a crash, the energy absorption element 61 is continuously turned up or inverted, as described above, wherein during the turning-up the shaping portion 63 which is then substantially semi-toroidal moves forwards with the bending track B thereof in the direction of the crash force C relative to the covering unit 4. As a result, the kinetic energy which is introduced via the actuation unit 3 is absorbed and the actuation unit 3 is braked in a controlled manner relative to the covering unit 4.

Figure 3:
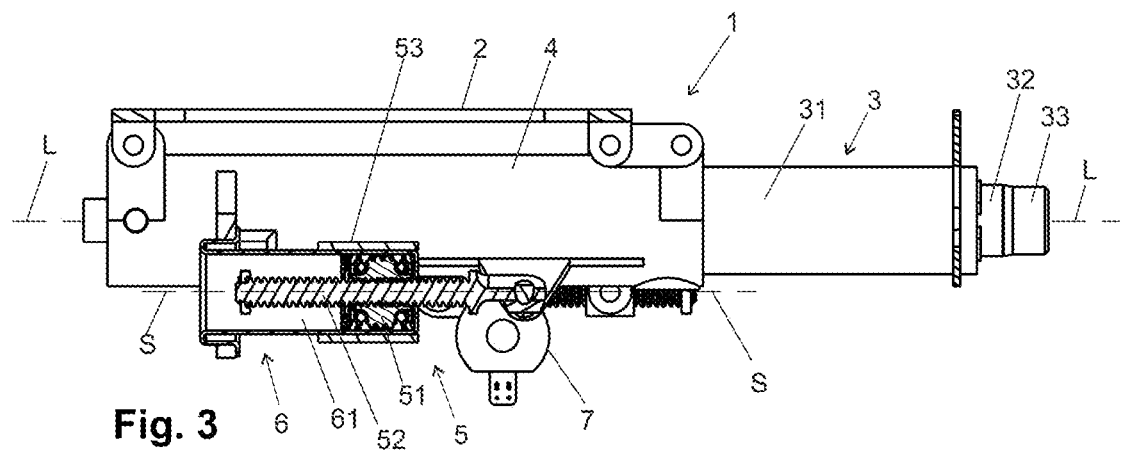
FIG. 3 shows a sectional view through the steering column of FIG. 1 along the adjustment axis.
Figure 6:
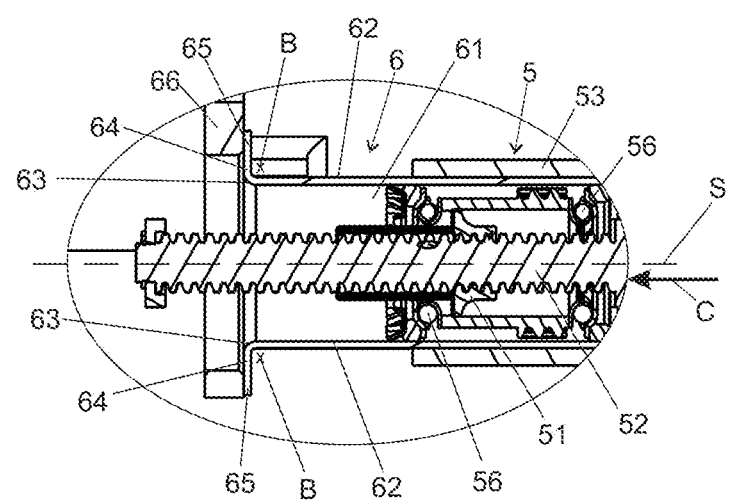
FIG. 6 shows an enlarged sectional view through the energy absorption apparatus in another embodiment in a normal operating state.

FIG. 6 shows an enlarged sectioned view along the spindle axis S through the energy absorption device 6 in a modified embodiment compared with FIG. 3 in a normal operating state prior to a crash. In this instance, the shaping portion 53 is initially not rounded in the form of a half torus as in FIG. 3, but instead substantially in the form of a quarter torus. The outer portion 64 which adjoins the shaping portion 63 extends in this non-shaped state initially still in a radial manner between the outer edge of the shaping portion 63 and the inner edge of the flange 65. In the event of a crash, the inner portion 62 is introduced in the manner of the first embodiment in the direction of the crash force C axially through the flange 65, wherein the outer portion 64 is moved in an opposing axial direction externally over the inner portion 62 so that in the event of the crash in principle the state shown in FIG. 5 is produced. In this instance, the bead, which is substantially in the form of a quarter circle in cross section in the normal operating state, of the shaping portion 63 is initially shaped in a semi-circular manner in cross section and subsequently then substantially in the form of a half torus. The energy absorption mechanism described is identical.

For height adjustment, a second motorised adjustment drive 7 which engages between the covering unit 4 and the carrier unit 2 may be provided. It may also be in the form of a spindle drive and may also have an energy absorption device 6 which can be constructed according to the disclosure or differently.

The methods and systems of the present disclosure, as described above and shown in the drawings provide for a steering column with superior properties including increased reliability and ease of use. While the apparatus and methods of the subject disclosure have been showing and described with reference to embodiments, those skilled in the art will readily appreciate that changes and/or modifications may be made thereto without departing from the spirit and score of the subject disclosure.

LIST OF REFERENCE NUMERALS

1 Steering column
2 Carrier unit
20 Pivot axis
21 Securing means
22 Pivot bearing
3 Actuation unit
31 Inner cover (covering pipe)
32 Steering spindle
33 Securing portion
34 Transmission element
4 Covering unit
41 Actuation lever
42 Through-opening
5 Adjustment drive
51 Spindle nut
52 Threaded spindle
53 Drive unit
54 Securing element
55 Motor (drive motor)
56 Bearing arrangement
6 Energy absorption device
61 Energy absorption element
62 Inner portion
63 Shaping portion
64 Outer portion
65 Flange
66 Support element
7 Adjustment drive
L Longitudinal axis
H Vertical direction
S Spindle axis (threaded spindle axis)
B Bending track
C Crash force

What is claimed is:

1. A steering column for a motor vehicle comprising:
at least two structural elements configured to be adjusted relative to each other;
a linear adjustment drive configured to be adjusted in an adjustment direction, in a motorised manner, along an adjustment axis (S), the linear adjustment drive comprising a spindle drive having a threaded spindle, the linear adjustment drive configured to engage one of the at least two structural elements; and
an energy absorption device comprising an energy absorption element arranged between the linear adjustment drive and at least one of the at least two structural elements, wherein the energy absorption element is disposed outside of the threaded spindle and includes an inner portion coaxial relative to the adjustment axis (S) and is connected by an at least partially coaxially extending shaping portion in a sleeve-like manner to an outer portion of the energy absorption element which is arranged coaxially at an outer side thereof.

2. The steering column of claim 1, wherein the shaping portion is part-torus shaped.

3. The steering column of claim 1, wherein the outer portion and/or the inner portion and/or the shaping portion are constructed in a rotationally symmetrical manner.

4. The steering column of claim 1, wherein the outer portion and/or the inner portion are constructed in a tubular manner.

5. The steering column of claim 1, wherein the energy absorption element is constructed as a single piece.

6. The steering column of claim 1, wherein the energy absorption element is constructed from a metal material and/or a plastics material.

7. The steering column of claim 1, wherein the outer portion or the inner portion is axially connected to one of the at least two structural elements by a support element and is axially supported against the support element.

8. The steering column of claim 1, wherein one of the at least two structural elements is a covering unit and one of the at least two structural elements is an actuation unit, wherein the actuation unit is configured to be adjusted in a longitudinal direction along a longitudinal axis (L), and/or wherein a carrier unit and the covering unit are configured to be adjusted relative thereto in a longitudinal direction and/or in a vertical direction.

9. The steering column of claim 1, wherein the linear adjustment drive is axially supported on the inner portion or the outer portion of the energy absorption element.

10. The steering column of claim 1, wherein the adjustment drive includes a motorised drive unit and an adjustment element configured to be adjusted relative thereto.

11. The steering column of claim 1, wherein the spindle drive includes a drive unit connected to the energy absorption device.

* * * * *